No. 879,939. PATENTED FEB. 25, 1908.
T. D. BAUSHER.
THAWING FURNACE TRUCK.
APPLICATION FILED DEC. 21, 1907.

Witnesses
J. O'R. Kelly
M. C. Müller

Thomas D. Bausher, Inventor
By Attorney Ed. T. Kelly

UNITED STATES PATENT OFFICE.

THOMAS D. BAUSHER, OF READING, PENNSYLVANIA.

THAWING-FURNACE TRUCK.

No. 879,939.  Specification of Letters Patent.  Patented Feb. 25, 1908.

Application filed December 21, 1907. Serial No. 407,507.

*To all whom it may concern:*

Be it known that I, THOMAS D. BAUSHER, citizen of the United States, residing at Reading, in the county of Berks and State of Pennsylvania, have invented certain new and useful Improvements in Thawing-Furnace Trucks, of which the following is a specification.

This invention relates to a truck adapted to carry a number of thawing furnaces and the object is to provide a device which may be used on railways for the purpose of thawing the ice from switches, detector bars etc. and wherever it is desired to clear an operating portion of the track, so that it may be properly operated in cold weather.

The device is intended particularly to carry a number of furnaces such as described in United States Letters Patent No. 868,247, issued to me under date of October 15th. 1907.

The object is to carry a number of furnaces, compactly arranged and in such manner that a few minutes application along the rail line will suffice for thawing the ordinary "freeze up" of a switch. The truck will distribute the heat of the furnaces all along the rail for approximately a distance of ten feet, so that the entire part to be thawed is operated on at one time.

The truck consists of a drop frame arranged on wheels adapted to travel on the track. These frames carry and support the furnaces at a very short distance, approximately one inch, above the surface of the rail. As my furnaces, described and shown in the above noted patent, are intended to throw the heat down, it will be seen that I secure not only quick but uniform results from the even distribution of heat to the parts frozen.

The invention is more fully described in the following specification and clearly illustrated in the accompanying drawing, in which:—

Figure 1:
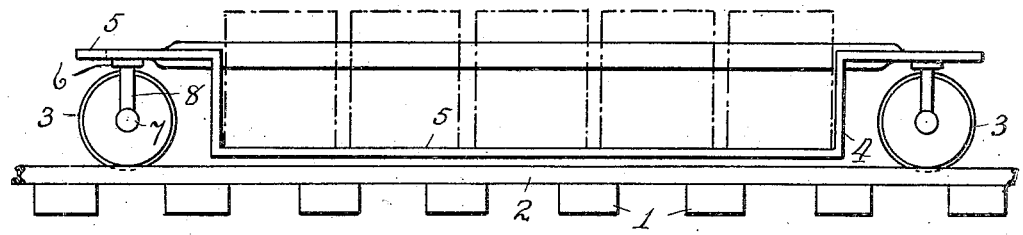
Figure 3:
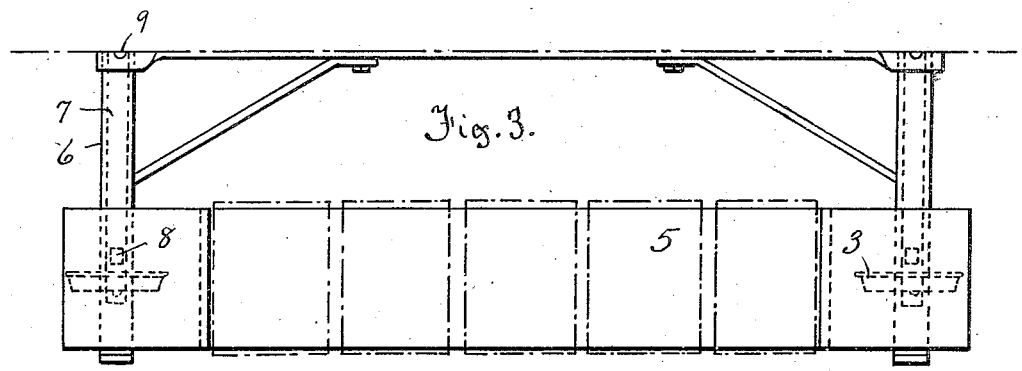
Figure 2:
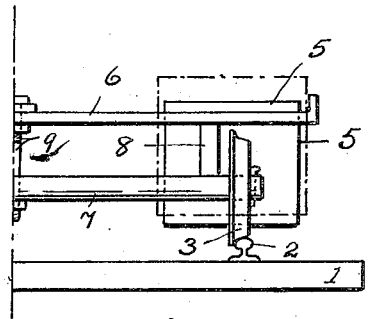

Figure 1—is a side elevation; Fig. 2 is an end view and Fig. 3 is a plan view of my truck.

The numeral 1 designates the road bed and 2 the rail; 3 indicates the truck wheels and 4 the frame. This frame comprises two angled pieces 5 the ends of which are supported above the wheels and the intermediate portions of which depend between the line of the wheels to a point very close to the upper surface of the rail. The ends of these frame sections 5 are supported on cross-arms 6, one at either end of the truck, which arms in turn, rest upon uprights 8, which uprights extend up from the axles 7, one near either end. Each of these cross-arms is joined to the axle beneath it by means of a bolt 9 which permits the axle and cross-arm to turn slightly, giving the required movement when the truck is making a curve. The furnaces rest on the depending portion of the frame pieces 5, preferably five along either side, as indicated by dotted lines. The truck may be supplied with flat wheels for use on an ordinary road, as for instance where large sewer covers or man holes are to be freed from ice.

Having thus fully described my invention what I claim and desire to secure by Letters Patent is:—

A truck comprising a set of wheels and axles, a frame comprising two angled pieces and two cross-arms, said angled pieces being joined together at their ends by said cross-arms and having the portions between the ends thereof depressed to a point very close to the surface on which the wheels rest, uprights on said axles on which the ends of said cross arms rest, bolts pivotally connecting each axle with the cross-bar above it, and a series of thawing furnaces located in the depending portions of said frame pieces, all substantially as and for the purpose set forth.

In testimony whereof I affix my signature, in presence of two witnesses.

THOMAS D. BAUSHER.

Witnesses:
 ED. A. KELLY,
 CAMERON E. STRAUSS.